United States Patent [19]

Irnich

[11] Patent Number: 5,551,666

[45] Date of Patent: Sep. 3, 1996

[54] BUTTERFLY FLAP VALVE

[75] Inventor: Franz-Josef Irnich, Hürtgenwald-Gey, Germany

[73] Assignee: Zimmerman & Jansen GmbH, Germany

[21] Appl. No.: 260,891

[22] Filed: Jun. 16, 1994

[51] Int. Cl.$^6$ ........................................................ F16K 1/22
[52] U.S. Cl. ............................................. 251/160; 251/161
[58] Field of Search ........................................ 251/160, 161

[56] References Cited

U.S. PATENT DOCUMENTS

| | | | |
|---|---|---|---|
| 2,577,725 | 12/1951 | Drake | 251/160 |
| 2,833,511 | 5/1958 | Fletcher | 251/160 X |
| 3,030,065 | 4/1962 | Wallace | 251/160 |
| 3,272,223 | 9/1966 | Sass | 251/161 X |
| 3,306,571 | 2/1967 | Bussi et al. | 251/160 X |
| 3,591,127 | 7/1971 | Luger et al. | 251/161 X |

FOREIGN PATENT DOCUMENTS

| | | | |
|---|---|---|---|
| 2250414 | 5/1975 | France | 251/161 |
| 2810446 | 9/1978 | Germany | 251/160 |

*Primary Examiner*—John C. Fox
*Attorney, Agent, or Firm*—Pravel, Hewitt, Kimball & Krieger

[57] ABSTRACT

Butterfly flap valve (10) comprising a valve housing (12) with an axial flow aperture (14), a flap shaft (16) that projects out of the valve housing (12), crosses the flow aperture (14) substantially diametrically and can be operated by means of a drive mechanism disposed outside the valve housing (12), and a closure flap (22) attached to the flap shaft (16) to close the flow aperture.

In this system, to move the closure flap (22) out of the closed position into the position in which the flow aperture (14) is open, the closure flap (22) is first lifted away from the valve seat (24) and then swiveled within the flow aperture (14) by way of the connection of the flap shaft (16) both to a lever system (28), consisting of a first lever element (44) and a second lever element (46), and to an actuator shaft (30) coupled to the drive mechanism. The same connections also operate for movement of the closure flap (22) out of the open position into the closed position, in which the closure flap (22) is first swiveled within the flow aperture (14) and subsequently set onto the valve seat (24).

3 Claims, 2 Drawing Sheets

BUTTERFLY FLAP VALVE

DESCRIPTION

The invention relates to a butterfly flap valve according to the precharacterizing clause of Claim 1.

From DE-AS 22 47 789 a butterfly flap valve of this kind is known. This known butterfly flap valve comprises a valve housing with an axial flow aperture. This known butterfly flap valve further comprises a valve shaft that projects out of the valve housing, passes substantially diametrically through the flow aperture and can be actuated by way of a drive mechanism disposed outside the valve housing. Finally, in this known butterfly flap valve the valve shaft is also provided with a closure flap to close off the flow aperture. To move the closure flap out of the closed position and into the position that opens the flow aperture, the closure flap is first lifted away from the valve seat and then swiveled within the flow aperture. Conversely, for movement from the open into the closed position, the closure flap is first swiveled within the flow aperture and subsequently seated on the valve seat.

A particular disadvantage of this known butterfly flap valve has been found to be its elaborate construction and hence high manufacturing cost. That is, in order to lift the closure flap from the valve seat before the swiveling movement and to seat it on the valve seat after the swiveling movement, a relatively complicated structure is provided for precise control. Here control is effected by guiding several pilot pins in correspondingly formed guide grooves. Because there are so many individual components, even slight manufacturing inaccuracies can degrade or actually prevent faultless and reliable operation of the closure flap. Furthermore, assembly of this known butterfly flap valve is also very difficult because some of the pilot pins must be installed under spring loading.

To avoid the above disadvantages, in DE-AS 25 28 714 it is proposed to mount the closure flap eccentrically on an actuator shaft, such that the eccentricity amounts to only a few millimeters. As a result of this eccentric mounting of the closure flap, during the opening and closing process the closure flap moves in a straight line as it is lifted off and seated. The subsequent swiveling movement of the closure flap is enforced by a lever attached to the closure flap and disposed rotatably in the housing outside the flow aperture. Owing to the slight eccentricity of the closure-valve mounting, this lever must be very long in order to swivel the closure flap into the open position with an acceptable angle of rotation of the actuator shaft. It is impossible to design a structure of this kind that will function correctly within a very small space. Furthermore, because of the said slight eccentricity considerable torques are required to move the closure flap into the open position and back again.

Finally, in the known construction no centric pressure is exerted by way of the actuator system to hold the closure flap or flap plate against its seat in the housing and form a leakproof seal. Therefore it is impossible for the closure flap to be pressed uniformly onto its seat, as a result of which the closure flap becomes deformed when exposed to high pressure differences and allows leakage across the seat. The eccentric mountings are also extremely vulnerable to wear and tear, so that long-term reliable operation cannot be guaranteed.

The known construction according to U.S. Pat. No. 3,967,813 is likewise distinguished by long drive levers. To close the flap tightly large forces and moments must be exerted. The closure flap can therefore become leaky at high pressures.

It is also disadvantageous that the known drive mechanism for moving the closure flap is disposed in the middle of the flap, so that it is within the flow path.

In DE-PS 35 08 318, finally, another variant of a shutting flap is disclosed in which the closure flap is lifted off the leakproof seat in the housing or seated on it by a link gear that acts radially, i.e. not by a rotational movement of an actuator shaft functionally connected to the closure flap. This known construction therefore permits only short lifting strokes. Accordingly, the shutting flap has no leakproof seat on which to be seated with surfaces parallel. To make the valve leakproof an additional sealing material is necessary, so that the valve cannot be employed at high temperatures. Because likewise no centric pressure on the closure flap is provided by way of the actuator system, the closure flap cannot be uniformly pressed against the seat in the housing, with the consequence that the same problems of leakage arise here as in the construction according to DE-AS 25 28 714.

Finally, the known actuator system is suitable only for media that are absolutely free of solids, because of its open link-gear mechanism. Solid matter would get into the mechanism and be deposited there, with the consequence that the link gear would be blocked or even destroyed. Furthermore, because of the punctate contact between actuator system and link gear, only small forces can be absorbed or transmitted. Therefore this known construction is suitable only for small pressures.

Starting from the state of the art, the invention is directed to the problem of providing a butterfly flap valve according to the precharacterizing clause of Claim 1 that has a relatively uncomplicated structure within a very small space, accordingly enables remarkably simple manufacture and assembly, and in particular guarantees faultless, reliable operation of the closure flap in both directions of the flow channel even at high temperatures and with large pressure differences, wherein the components necessary for actually moving the closure flap are disposed outside the flow cross section of the butterfly flap valve.

This problem is solved by the characterizing measures in Claim 1.

As a result of the design in accordance with the invention, in which the flap shaft is connected by way of at least one end situated outside the valve housing to both a lever system and an actuator shaft that has a long axis parallel to the long axis of the flap shaft in the closed position and can be rotated by means of the drive mechanism, in such a way that as the closure flap is lifted away from the seat and swiveled and during the reverse movement the end of the flap shaft can be moved about the long axis of the actuator shaft along a circular path around the actuator shaft, a decidedly simple, low-cost construction is achieved. Moreover, the costs of manufacture and assembly can be kept low. On the one hand, by appropriate positioning of the actuator shaft or the actuator element with respect to the lever system, each of which acts on the at least one end of the valve shaft, such manufacturing inaccuracies as may be present can readily be compensated. On the other hand, assembly of the butterfly flap valve is greatly simplified, in large part because the components necessary to actually move the closure valve are all disposed apart from the flow cross section of the butterfly flap valve, i.e. outside the valve housing. A major advantageous consequence is faultless and reliable operation of the closure flap of the butterfly flap valve in accordance with the invention. Quite apart from this, larger centrically directed closing forces can also be obtained, owing to the lever system and the associated lengthening of the lever arms. This makes it possible to employ the butterfly flap valve in accordance with the invention even in extreme conditions, i.e. with very high pressures or pressure differences in both directions relative to the shutting flap and/or high temperatures, up to well over 600°C. Especially with one-sided design of the butterfly flap valve, i.e. with a lever system and an actuator shaft disposed at only one end of the flap shaft, still greater closing forces can be achieved because the flap shaft acts as a lever arm. Finally, the form of the butterfly flap valve in accordance with the invention also enables a very gentle placement of the closure flap on the valve seat by so-called "turning in", with the result that its operating life is increased.

By the subdivision of the actuator system for the closure flap in accordance with the invention into a flap shaft extending along one diameter of the closure flap and a separate actuator shaft that acts outside the valve housing, on the one hand large opening and closing moments can be produced and transmitted while on the other hand the high bending moments arising from the pressure difference at the closure flap can be sustained.

Furthermore, the construction in accordance with the invention makes it possible for the closure flap to be pressed centrically against the leakproof seat in the housing, so that there is no leakage even with large pressure differences.

Advantageous structural details of the butterfly flap valve in accordance with the invention are described in the subordinate claims. One aspect of the invention addresses the simplified manufacture and assembly as well as for faultless and reliable operation of the closure flap. First, manufacturing inaccuracies or the like can easily be compensated by tilting the flap shaft with respect to the long axis of the actuator shaft. Furthermore, because of the eccentric position of the flap shaft with respect to the actuator shaft, and because it is rotatable, movement of the end of the flap shaft on a circular path around the actuator shaft is assured. According to a second aspect of the invention a ball-and-socket joint or the like is disposed between the actuator element and the one end of the flap shaft, facilitate both simplified manufacture and a degree of self-adjustment of the closure flap during assembly.

Owing to the structural measures according to the second aspect of the invention namely to construct the lever system with a first and a second lever element that are reciprocally coupled to one another and connected both to the end of the flap shaft and to the valve housing or the like, manufacture and assembly are still further simplified and a high functional reliability of the whole butterfly flap valve is guaranteed.

Moreover, the characteristics according to a third aspect of the invention in which a corresponding coupling between the first and second lever element, the one end of the flap shaft and the valve housing by way of pins and ball-and-socket joint connections is provided, serve to assist movement of the end of the flap shaft on a circular path around the actuator shaft and, in addition, reduce the costs of manufacture and assembly of the butterfly flap valve as a whole.

The measures in accordance with a fourth aspect of the invention are also particularly advantageous because the actuator shaft in part or the actuator element, the one end of the flap shaft and the lever system form a compact, small structure incorporated in the housing or the like. Furthermore, the only part that must be sealed tightly is the actuator shaft that projects out of this housing or the like.

It is also preferably within the scope of the invention, according to a fifth aspect of the invention, that the valve housing be provided with an arcuate slot corresponding to the circular movement path of the flap shaft, through which one end of the flap shaft extends into the housing or the like. This makes it possible to minimize the size of the opening between the flow aperture and the interior of the housing or the like, in which part of the actuator shaft, the actuator element, the one end of the flap shaft and the lever system are accommodated.

Particularly in connection with the measures according to a sixth aspect of the invention, because of the very small arcuate slot it is possible to exclude gas and the dust it carries out of the flow aperture of the valve housing from the interior of the housing or the like in which the actuator element, the lever system etc. are accommodated.

Finally, it is equally within the scope of the invention, according to a seventh aspect of the invention, to connect each of the two ends of the flap shaft, which extend outside the valve housing, simultaneously to a lever system and an actuator shaft of the kind described above, in such a way that as the flap is lifted away from the valve seat and swiveled and during the reverse movement, each end of the flap shaft can move about the associated actuator shaft on a circular path around the associated actuator shaft.

Because the movement of lifting the closure flap away from the valve seat and replacing it, in particular with the one-sided embodiment of the butterfly flap valve in accordance with the invention, closely resembles a so-called "turning in", according to the measures in an eighth aspect of the invention, it is advantageous that the valve seat comprises a sealing surface perpendicular to the axial flow aperture. Preferably the valve seat can also, according to the characteristic in a ninth aspect of the invention, have a sealing surface that tapers conically toward the axial flow aperture.

As a result of the measures according to a tenth aspect of the invention, the closure flap is arranged so that it always swivels counter to the direction of rotation of the actuator shaft. This form of movement contrasts with the entire state of the art as described at the outset and permits the closure flap to be lifted away from and replaced onto the leakproof seat in the housing so that correct function is ensured, while the flap can be swiveled over a full 90° with no need to rotate the actuator shaft by more than 90°. The chosen relationships are such that the lever system can be made relatively small, in which regard it should be pointed out that in the lever system in accordance with the invention, when the closure flap opens or closes, the end of the flap shaft lying outside the valve housing is moved through the extended position of the guide-rod or lever connection "actuator shaft—flap shaft—rotational joint between first and second lever element". As a result, with an angle of actuator-shaft rotation amounting to only 90° there are produced both the lifting movement of the closure flap relative to the leakproof seat in the housing and a complete swiveling of the flap shaft and hence the closure flap, likewise by 90°.

Additional characteristics, advantages and details of the invention will become apparent in the following description of some preferred embodiments of the invention, with reference to the drawings, wherein.

Figure 1:
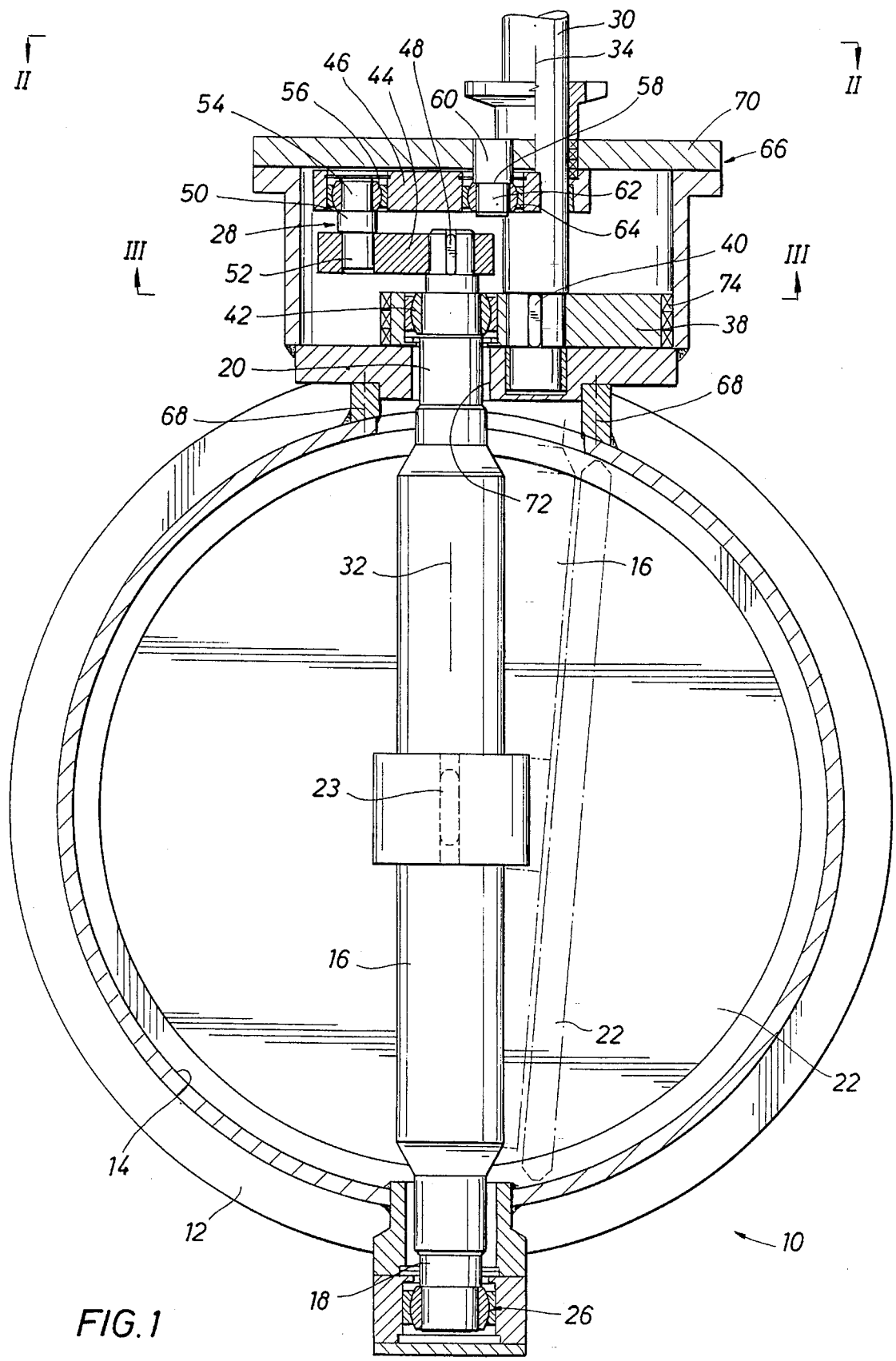
FIG. 1 shows a cross section through an embodiment of a butterfly flap valve in accordance with the invention with a closure flap in the closed position and—as indicated by a dot-dashed line—in the position in which the flow aperture is open.
Figure 2:
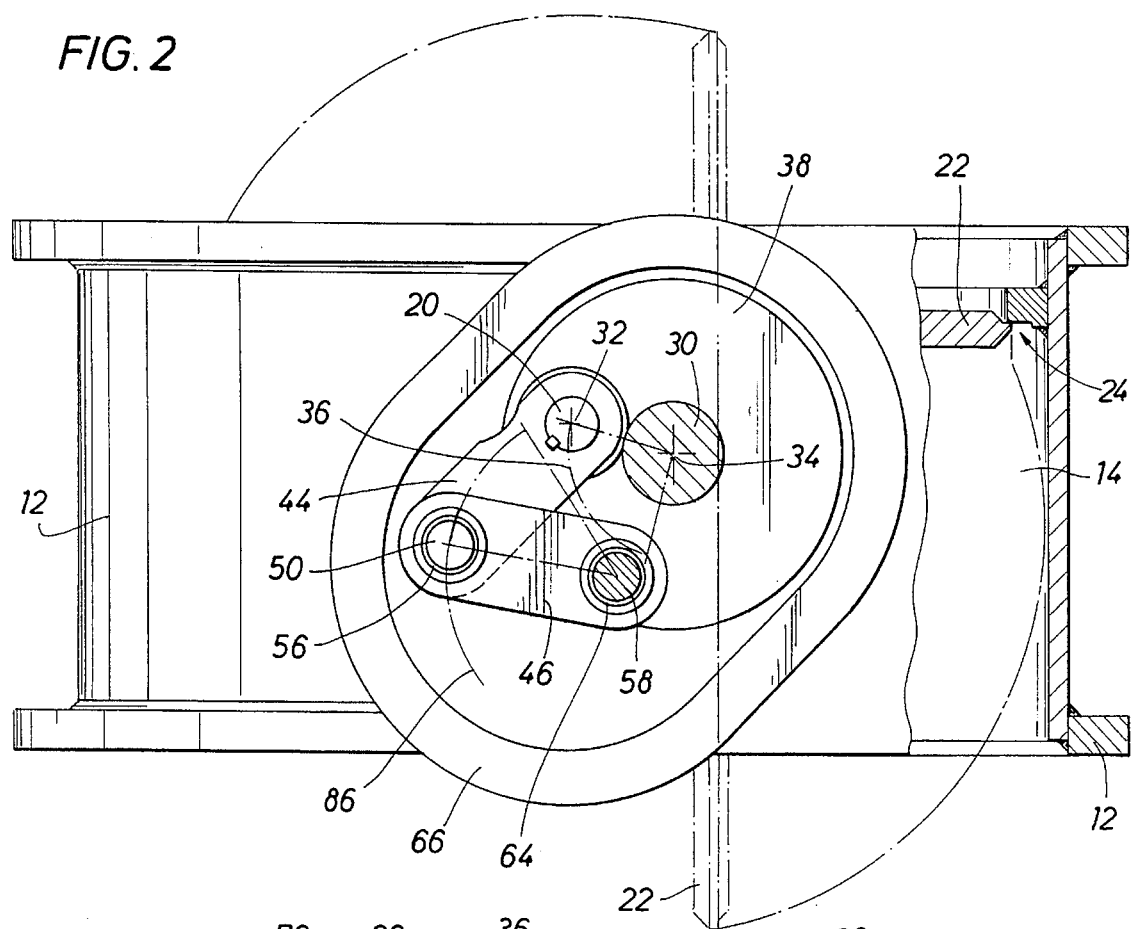
FIG. 2 is a partially opened side view of an embodiment of the butterfly flap valve in accordance with the invention as indicated by arrow II in FIG. 1.

In FIGS. 1 and 2 an embodiment of the butterfly flap valve 10 in accordance with the invention is shown in the closed position (continuous line) as well as in the open position (dot-dashed line). The butterfly flap valve 10 comprises a valve housing 12 with an axial flow aperture 14. The butterfly flap valve 10 further comprises a flap shaft 16, which at its two ends 18, 20 projects out of the valve housing 12, and which passes across the flow aperture 14 substantially along its diameter and can be actuated by way of a drive mechanism (not shown) disposed outside the valve housing 12. Attached to the flap shaft 16 by means of a tongue-and-groove connection 23 is a closure flap 22 to close off the flow aperture 14.

For movement of the closure flap out of the position in which the flow aperture 14 is closed, into the open position, the closure flap 22 is first lifted away from the valve seat 24 and then swiveled within the flow aperture 14. For movement out of the open position into the closed position, conversely, the closure flap 22 is first swiveled within the flow aperture 14 and then set onto the valve seat 24.

The flap shaft 16 is supported by one end 18 in a bearing 26 of conventional construction. To reach this bearing the end 18 extends through the valve housing 12. The bearing 26 itself is disposed outside the valve housing 12, in order not to influence flow through the flow aperture when the closure flap 22 is in the open position. The bearing 26 here, corresponding to FIG. 1, is constructed as a ball-and-socket joint or the like.

The flap shaft 16 is also connected, by its other end 20 which lies outside the valve housing 12, to a lever system 28 and an actuator shaft 30. The actuator shaft 30 has a long axis 34 that is parallel to the long axis 32 of the flap shaft 16 in the closed position and can be rotated by means of the drive mechanism (not shown). The coupling of the flap shaft 16 by way of its one end 20 to the lever system 28 and the actuator shaft 30 is such that during the process of lifting from the valve seat 24 and swiveling as well as the reverse process, the end 20 of the flap shaft 16 can be moved about the long axis 34 of the actuator shaft 30 on a circular path 36 around the actuator shaft 30, as can clearly be seen in FIG. 2.

To the actuator shaft 30 an actuator element 38 is non-rotatably attached, here by means of a tongue-and-groove connection 40. The actuator element 38 shown in FIGS. 1 and 2 is disk-shaped. Accommodated in the actuator element 38 is the one end 20 of the flap shaft 16, in such a way that it is eccentric to the actuator shaft 30, rotatable, and tiltable with respect to the long axis 34 of the actuator shaft 30. For this purpose, the actuator element 38 supports the one end 20 of the flap shaft 16 by way of a ball-and-socket joint connection 42 or the like.

The lever system 28 comprises a first lever element 44 and a second lever element 46, disposed substantially in parallel to the plane of movement of the actuator element 38, i.e. here perpendicular to the plane of the drawing in FIG. 1. The first lever element 44 is non-rotatably attached to the one end 20 of the flap shaft 16, e.g. by way of a tongue-and-groove connection 48. The second lever element 46 is connected to the first lever element 44 and the valve housing or the like so that it is both rotatable and can be tilted with respect to the first lever element 44 and with respect to the valve housing or the like.

As FIG. 1 shows, the first and the second lever elements 44, 46 are joined to one another rotatably and tiltably by way of a pin 50 or the like. The one end 52 of the pin 50 is fastened to the first lever element 44, for example by welding, whereas the other end 54 of the pin 50 is received by the second lever element 46 by way of a ball-and-socket joint 56 or the like. It is equally conceivable, however, for the one end 52 of the pin 50 to be welded to the second lever element 46 and for the other end 54 of the pin to be received by way of such a ball-and-socket joint or the like.

The second lever element 46 and the valve housing or the like or a part thereof are connected to one another rotatably and tiltably by way of a pin 58 or the like. The one end 60 of the pin 58 is welded to the valve housing or the like, whereas the other end 62 of the pin 58 is received by the second lever element 44 by way of a ball-and-socket joint connection 64. The other end 62 of the pin 58 can just as well be welded to the second lever element 44, the one end 60 of the pin 58 then being received at the valve housing or a part thereof with such a ball-and-socket joint or the like.

According to FIG. 1, the actuator element 38 and the lever system 28 are enclosed in a housing 66 or the like, which can be mounted on the valve housing 12 as part of the latter, for example by screws 68. In the present embodiment the second lever element 46 is thus coupled to the wall or to the cover plate 70 of the housing 66 or the like on the side away from the valve housing 12. Accordingly, the actuator element 38 attached to the actuator shaft 30 and engaging the one end 20 of the flap shaft 16, the first lever element 44 which is rotatably attached to the one end 20 of the flap shaft 16, and the second lever element 46 which is disposed between the first lever element 44 and the cover plate 70 are arranged next to one another in the housing 66 or the like in the above order, from the flap shaft 16 toward the actuator shaft 30.

The valve housing 12 is equipped with an arcuate slot 72, not shown in detail, corresponding to the circular path 36 of the flap shaft 16. Through the slot 72 the flap shaft 16 passes with its one end 20 from the flow aperture 14 into the housing 66 or the like. To exclude gas and dust, in particular, the actuator element 38, which is preferably constructed as a disk and is disposed within the housing 66 or the like on the side toward the valve housing 12 or the arcuate slot 72, is provided with a sealing device, e.g. in the form of a sealing cuff 74 or the like.

In the embodiment of the butterfly flap valve 10 in accordance with one aspect of the invention it has further proved advantageous for the valve seat 24 to have a sealing surface perpendicular to the axial flow aperture 14, as shown in FIG. 2. Such an arrangement of the sealing surface is advantageous in the one-sided embodiment of the butterfly flap valve 10 inasmuch as before the closure flap 22 is lifted away from or placed upon the leakproof seat 24, the closure flap 22 undergoes a movement depending on the circular path 36 that is equivalent to a so-called "turning in". The valve seat 24 can equally have a sealing surface that slants conically toward the axial flow aperture 14.

Figure 3:
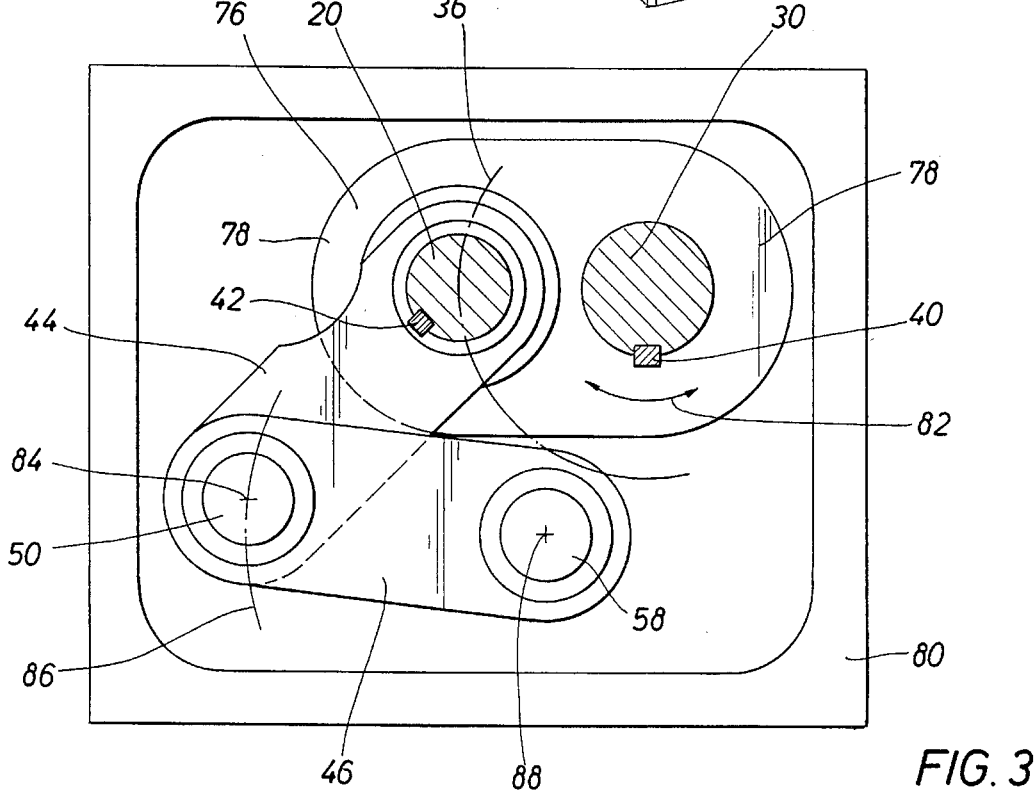
FIG. 3 shows a longitudinal section through another embodiment of the butterfly flap valve in accordance with the invention as shown in FIG. 2 along the line III—III in FIG. 1, enlarged.

In FIG. 3 a further embodiment of the butterfly flap valve 10 in accordance with the invention is illustrated, which basically differs from the embodiment according to FIGS. 1 and 2 with respect to the form of the actuator element 76. That is, the actuator element 76 according to FIG. 3 is not disk-shaped but rather has substantially the shape of a plate with semicircular end regions 78. Furthermore, the housing 80 or the like, which contains part of the actuator shaft 30 with the actuator element 76 and the lever system 28 comprising the first and second lever element 44, 46, conforms to the shape of the actuator element 76. Hence components corresponding to components in the embodiment of the butterfly flap valve according to FIGS. 1 and 2 are identified by the same reference numerals.

FIG. 3 shows clearly that the force imposed by the drive mechanism (not shown) is initially transferred from the actuator shaft 30 through the tongue-and-groove connection 40 to the actuator element 76. By rotation of the actuator shaft 30 according to the two-headed arrow 82, the actuator element 76 is forced to rotate in the same direction, shown by the two-headed arrow 82. The end 20 of the flap shaft 16, which is connected to the actuator element 76 both rotatably and tiltably by way of the ball-and-socket joint connection 42, thus moves about the long axis 34 of the actuator shaft 30 along the circular path 36 around the actuator shaft 30. At the same time, the end 20 of the flap shaft 16 is guided by way of the lever system 28, in that the rotatory and tilting movement of the flap shaft 16 is produced by the kinematic linkage. Accordingly, as shown in FIG. 3, the long axis 84 of the pin 50 moves along the circular path 86 about the long axis 88 of the pin 58 coupled to the housing 80. As the closure flap 22 moves out of the position in which the flow aperture 14 is closed into the open position and, conversely, as the closure flap 22 moves out of the open position back into the closed position, all that occurs is a reversal of direction.

The invention is not restricted to the exemplary embodiments of the butterfly flap valve 10 according to FIGS. 1 and 2 and according to FIG. 3. For example, it is equally conceivable that the flap shaft 16 is connected by each of the two ends 18, 20 lying outside the valve housing 12 simultaneously with a lever system—corresponding to the lever system 28—and an actuator shaft—corresponding to the actuator shaft 30—with a long axis—corresponding to the long axis 34—that in the closed position is parallel to the long axis 32 of the flap shaft 16 and that these two ends are both rotatable, by means of one common drive mechanism or by separated drive mechanisms. In this arrangement, during lifting away from the valve seat 24 and swiveling as well as the reverse movement the ends 18, 20 of the flap shaft 16 are both movable about the long axis—corresponding to the long axis 34—of the associated actuator shaft along a circular path—corresponding to the circular path 36—around the associated actuator shaft.

All the characteristics disclosed in the application documents are claimed as essential to the invention, to the extent that they are new to the state of the art singly or in combination.

I claim:

1. A butterfly flap valve, comprising:

a valve housing having a flow aperture within which a valve seat is circumferentially located;

a flap shaft extending across said flow aperture having a first end pivotally connected to said valve housing and a second end extending beyond said valve housing;

a flap carried by said flap shaft that seats against said valve seat when said flap shaft is in a valve closed position;

an actuator shaft having a long axis parallel to that of the flap shaft in the valve closed position;

means for linking said actuator shaft with the second end of said flap shaft such that upon rotation of said actuator shaft the second end of said flap shaft moves through an arc about the long axis of said actuator shaft to a valve open position;

a first lever having two ends, one end of which is non-rotatably affixed to said second end of said flap shaft;

a second lever having two ends, one end of which is pivotally affixed to a point that is stationary relative to said valve housing;

the second end of each of said first and second levers being pivotally secured to each other.

2. The butterfly flap valve of claim 1, wherein said actuator plate has end regions of semicircular shape.

3. The butterfly flap valve of claim 1, further comprising a drive motor coupled to said actuator shaft to rotate said actuator shaft.

* * * * *